(12) United States Patent
Göransson et al.

(10) Patent No.: US 10,070,396 B2
(45) Date of Patent: Sep. 4, 2018

(54) METHOD AND ARRANGEMENT FOR INTER-CELL INTERFERENCE COORDINATION

(71) Applicant: Telefonaktiebolaget LM Ericsson (publ), Stockholm (SE)

(72) Inventors: Bo Göransson, Sollentuna (SE); Tomas Andreason, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 72 days.

(21) Appl. No.: 15/123,921

(22) PCT Filed: Mar. 7, 2014

(86) PCT No.: PCT/SE2014/050286
§ 371 (c)(1),
(2) Date: Sep. 6, 2016

(87) PCT Pub. No.: WO2015/133953
PCT Pub. Date: Sep. 11, 2015

(65) Prior Publication Data
US 2017/0019862 A1    Jan. 19, 2017

(51) Int. Cl.
*H04W 72/04*   (2009.01)
*H04W 52/24*   (2009.01)
(Continued)

(52) U.S. Cl.
CPC ........ *H04W 52/244* (2013.01); *H04B 7/0456* (2013.01); *H04B 7/0617* (2013.01);
(Continued)

(58) Field of Classification Search
CPC ............. H04W 52/244; H04W 52/146; H04W 52/243; H04W 52/38; H04W 16/32; H04B 7/0456; H04B 7/0617; H04L 5/0032
See application file for complete search history.

(56) References Cited

U.S. PATENT DOCUMENTS

2010/0291940 A1    11/2010  Koo et al.
2010/0323711 A1    12/2010  Damnjanovic et al.
(Continued)

FOREIGN PATENT DOCUMENTS

WO    WO 2012/057462 A1    5/2012

OTHER PUBLICATIONS

International Search Report, Application No. PCT/SE2014/050286, dated Nov. 28, 2014.
(Continued)

*Primary Examiner* — Jay P Patel
(74) *Attorney, Agent, or Firm* — Sage Patent Group (57) ABSTRACT

Network node and method therein for inter cell interference coordination. A method in a network node comprises estimating spatial properties of a radio channel between a base station and at least part of an underlay/neighboring cell based on information about spatial properties of a radio channel between the base station and a respective at least one user equipment (UE) located in a region associated with inter cell interference in relation to the underlay/neighboring cell. A transmission is adapted to a UE, served by the base station in a reduced power subframe, based on a correlation between the spatial properties of the radio channel and estimated spatial properties of a radio channel between the base station and the UE. The method enables control of interference subjected towards the underlay/neighboring cell, caused by downlink transmission to the UE.

24 Claims, 5 Drawing Sheets

(51) Int. Cl.
*H04B 7/06* (2006.01)
*H04W 16/32* (2009.01)
*H04W 52/14* (2009.01)
*H04W 52/38* (2009.01)
*H04B 7/0456* (2017.01)
*H04L 5/00* (2006.01)

(52) U.S. Cl.
CPC ......... *H04W 16/32* (2013.01); *H04W 52/146* (2013.01); *H04W 52/243* (2013.01); *H04W 52/38* (2013.01); *H04L 5/0032* (2013.01)

(56) References Cited

U.S. PATENT DOCUMENTS

| | | |
|---|---|---|
| 2011/0194527 A1 | 8/2011 | Lin et al. |
| 2012/0083282 A1 | 4/2012 | Choi et al. |
| 2012/0201162 A1* | 8/2012 | Kim ..................... H04B 17/345 370/252 |
| 2012/0327866 A1* | 12/2012 | Krishnamurthy ..... H04W 52/10 370/329 |
| 2013/0044697 A1 | 2/2013 | Yoo et al. |
| 2013/0114573 A1* | 5/2013 | Suzuki .................. H04L 1/1887 370/336 |
| 2013/0194950 A1* | 8/2013 | Haghighat ............ H04W 24/02 370/252 |
| 2013/0336270 A1* | 12/2013 | Nagata .................. H04W 16/28 370/329 |
| 2014/0029532 A1* | 1/2014 | Han .................. H04W 72/0413 370/329 |
| 2014/0126440 A1* | 5/2014 | Frank .................. H04W 52/146 370/311 |
| 2014/0219243 A1* | 8/2014 | Meshkati ............ H04W 52/243 370/331 |

OTHER PUBLICATIONS

Written Opinion of the International Searching Authority, Application No. PCT/SE2014/050286, dated Nov. 28, 2014.

* cited by examiner

METHOD AND ARRANGEMENT FOR INTER-CELL INTERFERENCE COORDINATION

CROSS REFERENCE TO RELATED APPLICATION

This application is a 35 U.S.C. § 371 national stage application of PCT International Application No. PCT/SE2014/050286, filed on Mar. 7, 2014, the disclosure and content of which is incorporated by reference herein in its entirety. The above-referenced PCT International Application was published in the English language as International Publication No. WO 2015/133953 A1 on Sep. 11, 2015.

TECHNICAL FIELD

The solution described herein relates generally to Inter-Cell Interference Coordination ICIC, and in particular to ICIC in wireless communication systems applying multiple transmit antennas and precoding/beam forming.

BACKGROUND

In order to meet higher capacity demands and higher user experiences, heterogeneous networks, or hetnets, are considered as an important complement to densification of macro networks. Heterogeneous networks can be characterized as deployments with a mixture of macro cells and small cells with overlapping coverage areas. One example of such deployments is where small, so-called pico cells are deployed within the coverage area of larger macro cells to offload macro traffic and to provide higher bitrates by reducing the distance between users and the serving base station. A pico base station is an example of a low power node, LPN, transmitting with low output power, as compared to a high power node, and thus typically covers a much smaller geographical area than a high power node, HPN, such as a macro base station.

Figure 1A:
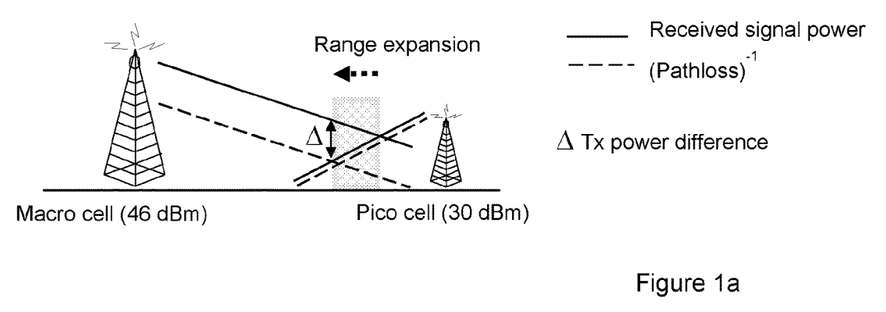
FIG. 1a illustrates range expansion in heterogeneous deployments, according to the prior art.

Small cells and macro cells can be deployed on same frequency or on separate frequencies. In scenarios with co-channel deployments, i.e. small cells operate on the same frequencies as the macro cells, there will be a link imbalance in best cell association for downlink, DL, and uplink, UL, transmissions. Typically, a user equipment, UE, will associate to the strongest cell, i.e. to the cell with the highest received DL power, which means that the DL coverage area is dominated by the macro cell. In the UL, however, the "best" cell is usually determined by lowest path loss. Hence, there will be a mismatch between the "best" cell for UL and DL transmissions as illustrated in FIG. 1. To some extent this can be alleviated by adding a bias term when cell association is done. By biasing the DL measurements, the network can associate a UE to a LPN even if the measured power is higher from the macro cell, HPN. By this, the coverage area of the LPN is increased, hence the term "range expansion". Cellular networks like 3GPP LTE have been designed for operations with a certain amount of range expansion (handover bias) which may, however, not be sufficient to achieve efficient operations of heterogeneous deployments with large power differences between LPNs and high power nodes.

One challenge associated with range expansion is the coverage of DL physical control channels transmitted from the LPN in the small cells, as reliable reception of the physical control channels is essential for data communications. In LTE, the Physical Downlink Control Channel, PDCCH, or/and the enhanced PDCCH, ePDCCH, carry the DL control information needed by a UE to receive and transmit data. With large range expansion, the inter-cell interference, ICI, from the macro cells could be excessively severe and prevent reliable detection of these control channels. A solution to this could be to introduce almost blank subframes, ABS, or reduced power subframes, RPSF, where UE specific transmissions in certain subframes from the macro node are either muted or transmitted with lower power. By this, the probability of detecting physical control channels will increase.

Figure 1B:
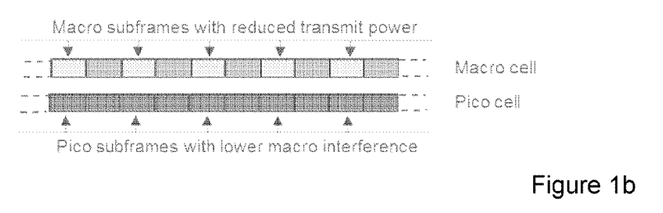
FIG. 1b illustrates the concept of reduced power subframes, according to the prior art.

The principle of ABS/RPSF is illustrated in FIG. 1b. In this case an interfering macro cell mute or reduce transmission power on data to macro users in certain subframes, in order to create protected radio resources for the pico cell. The macro base station indicates via the LTE inter-node interface X2 to the neighbor pico base station the subframes it intends to mute or reduce transmit power. The pico base station can then take this information into account when scheduling users operating within the cell range expansion zone; such that these users are prioritized to be scheduled in protected subframes, i.e. low interference subframes. Pico users operating near the pico base station may in principle be scheduled in all subframes. One may notice that ABS/RPSF assumes that pico cells are time synchronized to the macro cell.

However, a consequence of applying ICIC schemes like ABS/RPSF is the reduced capacity of the cooperating macro cells. Some investigations show that the net gain of introducing ABS/RPSF can be very small, or in some scenarios it actually reduces the overall system capacity.

SUMMARY

It would be desirable to reduce ICI, subjected e.g. to UEs in small cells in hetnet deployments, without introducing a capacity loss as the one associated with previously known solutions.

According to a first aspect, a method is provided, which is to be performed by a network node in a wireless communication network, in which precoding/beam forming and also reduced power subframes for inter-cell interference mitigation are applied. The method comprises estimating spatial properties of a radio channel R1 between a base station BS1 and at least part of an underlay/neighboring cell based on information about spatial properties of a radio channel between the base station BS1 and a respective at least one UE, UEi, located in a region associated with inter cell interference in relation to the underlay/neighboring cell. The method further comprises adapting a transmission to a UE, served by the base station BS1, in a reduced power subframe, based on a correlation between the spatial properties of the radio channel R1 and estimated spatial properties of a radio channel between the base station BS1 and the UE.

According to a second aspect, a network node is provided, which is operable in a wireless communication network applying precoding/beam forming and also applying reduced power subframes for inter-cell interference mitigation. The network node comprises at least one processor and at least one memory containing instructions executable by said at least one processor, whereby the network node is operative to estimate spatial properties of a radio channel R1 between a base station BS1 and at least part of an underlay/neighboring cell based on information about spatial properties of a radio channel between the base station BS1 and a respective at least one user equipment, UEi, located in a region associated with inter cell interference in relation to the underlay/neighboring cell. Execution of the instructions further renders network node operative to adapt a transmission to a UE, served by the base station BS1, in a reduced power subframe, based on a correlation between the spatial properties of the radio channel R1 and estimated spatial properties of a radio channel between the base station BS1 and the UE.

According to a third aspect, a network node is provided which is operable in a wireless communication network applying precoding/beam forming and also applying reduced power subframes for inter-cell interference mitigation. The network node comprises an estimating unit for estimating spatial properties of a radio channel R1 between a base station BS1 and at least part of an underlay/neighboring cell based on information about spatial properties of a radio channel between the base station BS1 and a respective at least one UE, UEi, located in a region associated with inter cell interference in relation to the underlay/neighboring cell. The network node further comprises an adapting unit for adapting a transmission to a UE, served by the base station BS1, in a reduced power subframe, based on a correlation between the spatial properties of the radio channel R1 and estimated spatial properties of a radio channel between the base station BS1 and the UE.

According to a fourth aspect, a computer program is provided, comprising computer readable code means, which when run in a network node causes the network node to perform the method according to the first aspect.

According to a fifth aspect, a computer program carrier is provided, which comprises a computer program according to the fourth aspect.

BRIEF DESCRIPTION OF THE DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

Within this description, mainly LTE terminology will be used when explaining the principles of the solution presented herein. However, the solution is also applicable in wireless communication systems operating according to other standards, which apply multiple antenna transmission and precoding/beam forming.

Some examples herein will be described in a hetnet scenario, where interference is caused by a high power node, denoted e.g. "macro" node/cell, to a Low Power Node, LPN, denoted e.g. "pico" node/cell. The high power node may also be referred to as the "aggressor" node, and the LPN may also be referred to as the "victim" node. However, the solution is also applicable in scenarios with neighboring nodes of other power relation, e.g. nodes of equal power. In the description, one of the nodes will also be denoted BS1 and the other BS2, where BS1 could be a high power node and BS2 could be a LPN, or BS1 and BS2 could have other power relations.

In a heterogeneous network deployment, as previously mentioned, the interference situation is very different in uplink, UL, and downlink, DL. The DL coverage area of a high power node may overlap considerably with the UL coverage area of a LPN. This effect is usually referred to as cell range expansion and is depicted in FIG. 1. One way to combat the negative effects from range expansion is to introduce ABSF, almost blank subframes, or RPSF reduced power subframes, in which the high power node (macro) can reduce the transmitted power of certain subframes. By this, a user equipment, UE, can be served by the LPN for which the UL is strongest. One drawback with ABSF/RPSF is the loss in capacity that such a "silent" subframe will provide, since practically no users can be scheduled from the macro node in such a subframe. If a user is scheduled in such a subframe, only a very low power could be used, cf. RPSF.

Figure 2:
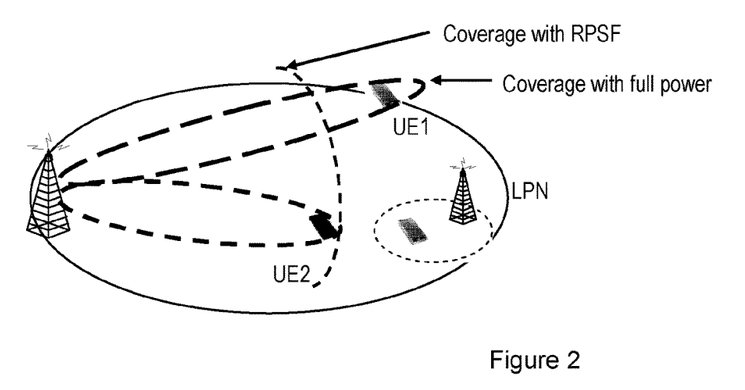
FIG. 2 illustrates spatial reuse with reduced power subframes, according to an exemplifying embodiment.

However, this problem could be avoided if users which are well separated, e.g. in the spatial domain, from the LPN were scheduled with high power and only users for which a transmission would interfere with the LPN were scheduled with lower power. This is illustrated in FIG. 2, where it can be seen that a UE which is spatially separated from the LPN can be served by high power, and thus the capacity loss associated with conventional use of techniques such as ABS or RPSF could be avoided.

A UE operating in connected mode can be requested, by the serving base station, to perform channel state information, CSI, measurements and provide CSI reports. When applying precoding/beamforming, a CSI report may comprise e.g. a suitable rank indicator, RI, one or more precoding matrix indices, PMIs, and a channel quality indicator, CQI. Other types of CSI are also conceivable including explicit channel feedback and interference covariance feedback. With the feedback, the base station can decide upon a certain transmission scheme as well as on a proper user bit rate for the transmission when scheduling the user in downlink. In LTE, both periodic and aperiodic CSI reporting is supported. In the case of periodic CSI reporting, the terminal reports the CSI measurements on a configured periodical time basis on the physical uplink control channel, PUCCH, whereas with aperiodic reporting the CSI feedback is transmitted on the physical uplink shared channel, PUSCH, at pre-specified time instants after receiving the CSI grant from the base station. With aperiodic CSI reports, the base station can thus request CSI reflecting downlink radio conditions in a particular subframe.

However, no information is received from neighboring cells on how a signal transmitted from a base station is received in said neighboring cells, e.g. in a cell expansion area or edge-zone. Herein, functionality is introduced, which enables a network node to estimate or determine the spatial properties of a radio channel to a neighboring cell, and thus enable avoidance or mitigation of inter cell interference, ICI, in resources with interference restrictions, such as RPSFs.

Herein, subframes will be discussed, in which a base station BS1 is obliged to keep its interference towards a neighboring node/cell within predefined limits. The interference allowed in such subframes may be lower than the interference allowed in other, normal or regular subframes, cf. the previously described concept of ABS and RPSF. As previously explained, a neighboring base station BS2 may utilize such low interference subframes for transmitting control information or similar to UEs e.g. near a cell border. This type of subframes could and will herein be referred to e.g. as protected subframes, reduced power subframes, interference-limited subframes or RPSF.

By assuming that the spatial properties of radio channels between an aggressor high power node and a victim LPN/cell are known by the aggressor high power node, it would be possible to only reduce the power, as in RPSF, for UEs associated with similar spatial properties as the LPN in a protected subframe. As an alternative to reducing the transmission power to mitigate the ICI, UEs with similar spatial properties could be served from the high power node using a down-tilted antenna pattern which effectively limits the range of the transmission.

However, when scheduling UEs with other spatial properties, full transmit power, or at least a higher transmit power than considered for RPSF, can be used since the main bulk of the power would be directed towards another direction or be otherwise orthogonal to the properties associated with the LPN cells. With reference to FIG. 2, it can be seen that UE2 is located in the same direction from the macro node as the LPN. Hence, when this user is served a transmit power as in RPSF is needed, while UE1 can be served with full transmit power since it is located in another direction than the LPN.

By realizing that direction is tightly coupled with the choice of precoder matrix indicator, PMI, performed by a UE e.g. in LTE, the PMI or corresponding information, can be used to discriminate between users. Thus, the transmit power on data from the aggressor node to a user, and/or its antenna tilting, may then depend on the PMI, or corresponding information, associated with the user.

In the following paragraphs, different aspects of the solution disclosed herein will be described in more detail with references to certain embodiments and to accompanying drawings. For purposes of explanation and not limitation, specific details are set forth, such as particular scenarios and techniques, in order to provide a thorough understanding of the different embodiments. However, other embodiments may depart from these specific details.

Exemplifying embodiments of a method performed by a network node will now be described with reference to FIG. 3a. The network node is operable in a wireless communication network applying multiple antenna transmission and precoding/beam forming, and further applying reduced power subframes for inter-cell interference coordination or mitigation. The network node may be a radio base station, or a node controlling or at least interacting with a more or less advanced radio base station. The method described below could alternatively be performed in a distributed manner. In such a case the term "network node" may embrace more than one physical node, e.g. a radio base station and a core network node.

Figure 3:
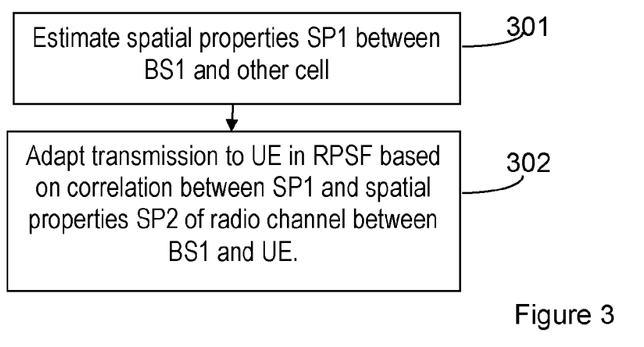
FIG. 3 illustrates a procedure in a network node, according to an exemplifying embodiment.

FIG. 3 illustrates the method comprising estimating 301 spatial properties of a radio channel R1 between a base station BS1 and at least part of an underlay/neighboring cell based on information about spatial properties of a radio channel between the base station BS1 and a respective at least one UE, UEi, located in a region associated with ICI in relation to the underlay/neighboring cell. The method further comprises adapting 302 a transmission to a UE, served by the base station BS1, in a reduced power subframe, based on a correlation between the spatial properties of the radio channel R1 and estimated spatial properties of a radio channel between the base station BS1 and the UE.

The information about spatial properties of a radio channel between the base station BS1 and a respective at least one UEi, may be obtained in different ways, which will be described below. Below, the base station BS1 may be referred to as "the macro", and the underlay and/or neighboring cell may be referred to as "the pico".

In one embodiment, the information may be derived from UEs which have recently been handed over from the pico cell to BS1/the macro cell; and/or from UEs which are in question for hand over to the pico cell, e.g. are about to be handed over from BS1 to the pico cell. By "being in question for hand over" is meant a UE which reports a received signal strength, e.g. RSRP, from the pico cell, which is indicative of that it is, or may soon be, in a position where it is appropriate that it is handed over to the pico cell, according to applied rules for handover. That is, the received signal strength from the underlay/neighboring cell has a certain relation to a received signal strength from the serving cell/BS1.

A UE which is just handed over from, or is in question for hand over to, the pico cell may be concluded to be located in a cell edge zone between the cells, and thus located in a similar spatial direction as the pico cell, as seen from BS1. Thus, the spatial properties of the respective radio channels to one or more such UEs could be utilized to estimate the spatial properties of a radio channel between the base station BS1 and at least a part of the pico cell.

The base station BS1 has information about which UEs that are in a hand over process with a neighboring cell, and about which UEs that are in question for being handed over to another cell. Further, the base station BS1 has access to reports of channel properties from UEs which are served by and connected to BS1. Such reports may be received regularly; upon certain events, and/or e.g. on request. Thus, in an embodiment where information is received from UEs associated with hand over, the information necessary to estimate the spatial properties of a radio channel to an underlay/neighboring cell is available at or from BS1.

In another embodiment, the information about spatial properties of a radio channel between the base station BS1 and a respective at least one UEi, may be derived from UEis which are served by a base station BS2 in the pico cell. This requires that these UEs are operable to report spatial properties of a radio channel related to BS1 to their serving base station BS2. The serving base station BS2 should in its turn be operable to report the spatial properties, or an indicator thereof, to the neighboring node BS1. UEs typically perform measurements on signals from neighboring cells, e.g. for mobility reasons, but normally it is only the received signal strength or path loss that is reported or used e.g. for ranking neighboring cells as hand over candidates. However, in the case where a UE reports, to its serving base station BS2, e.g. a preferred PMI in relation to a neighboring cell, this preferred PMI could be indicated to a network node associated with the neighboring cell, e.g. BS1, by the serving base station BS2.

Another way of deriving information about spatial properties from UEs located within an underlay cell is to force UEs served by the base station BS2 in the underlay cell to hand over to BS1. This could be achieved e.g. by a controlled shut down of the underlay cell. The base station BS1 would then, after the forced hand over, receive information about e.g. preferred PMI from UEs located in positions within the area, which until recently was covered by the shut-down cell. Alternatively, UEs located in an edge-region, such as a cell expansion area, could be deliberately handed over for the same reasons.

The information on spatial properties may alternatively be denoted e.g. "reports" or "feedback", and may comprise different information as mentioned above. The information could be explicit measurement results or e.g. a quantized value associated with channel properties. In a more specified case, the indicators may comprise a CSI, or be referred to as comprising a PMI. It should be noted that a PMI could be part of CSI. Again, this is mainly LTE terminology, but the terms could be replaced with corresponding names on the corresponding reports in other radio access technologies. The information from the different UEs may comprise or indicate different information. For example, the information from the at least one UEi could comprise explicit channel characteristics, and the estimated spatial properties related to the UE served by BS1 may comprise a PMI.

The estimate of the spatial properties of a radio channel R1 between a base station BS1 and at least part of an underlay/neighboring cell may be an average of a number of spatial properties, or indicators thereof, associated with different UEs. This may be useful to reduce effects of interference on the determining of spatial properties in the UEis. For example, for certain antenna arrangements the spatial properties, e.g. PMI, represent a physical direction, and an averaging of the directions can provide a more stable estimate. For example, the estimate may be a mean or median value, an interpolated value or a weighted value or result of a function derived e.g. based on simulations.

The estimation may, as previously described, comprise determining or calculating a mean value or a weighted sum based on information from the UEis. The estimation may alternatively comprise estimating the spatial properties of a radio channel R1 between the base station BS1 and at least part of the underlay/neighboring cell to be the same as the spatial properties of a radio channel between the base station BS1 and one of the UEis. The estimation may alternatively or in addition comprise generating a map of preferred PMs/PMIs, or corresponding information, in different positions and/or directions, given e.g. by GPS information, in a cell. The creating of a map will be further described below.

The region associated with ICI in relation to the underlay/neighboring cell may be defined as a region where there is a certain relation between received signal strength from the two cells or nodes. For example, the region where the received signal strength of signals from the base stations in the two cells is equally strong and/or where a difference in received signal strength is within a predefined interval. Typically, this would be a region at the cell border, e.g. the part of a cell expansion area in a direction of the high power node BS1. This would be a region where a UE would benefit in terms of reduced ICI when an overlay/neighboring macro performed the method described above.

The adapting/adaptation of a transmission to a UE, served by the base station BS1, in a reduced power subframe may comprise selecting, based on the correlation, at least one of: a transmission power; a downlink transmission tilt; a category of subframes in which to schedule the UE, and a precoder matrix for transmission to the UE.

The adaptation of a transmission may further comprise, when the correlation exceeds a threshold T, one or more of: refraining from scheduling the UE in the reduced power subframe in question; applying a transmission power $P_L$ for a transmission to the UE when scheduled in the reduced power subframe in question, wherein the transmission power $P_L$ is lower than a regular transmission power used in a non-reduced power subframe; applying a transmission direction tilt for a transmission to the UE when scheduled in the reduced power subframe; or determining an alternative precoder matrix to be used for a transmission to the UE when scheduled in the reduced power subframe.

When the correlation does not exceed the threshold T, the adaptation may comprise applying a transmission power $P_H$ for a transmission to the UE when scheduled in the reduced power subframe, wherein the transmission power $P_H$ is higher than transmission power $P_L$.

The protected subframe or reduced power subframe mentioned above refers to a certain reduced power subframe or a certain set or category of reduced power subframes, which is associated with an underlay/neighboring cell. There may be multiple sets of reduced power subframes, which are associated with different underlay cells and different spatial properties. This will be further described below.

In some embodiments, the information about spatial properties of a radio channel between the base station BS1 and the respective at least one UEi comprises a PMI or an indicator thereof; and/or a channel covariance or an indicator thereof. Other alternatives are e.g. different explicit spatial characteristics or some representation thereof, other than PMI. However, an indicator of a precoder matrix is a practical alternative, at least in LTE implementations, since this is a parameter which is determined and communicated by UEs also for other purposes.

Figure 4:
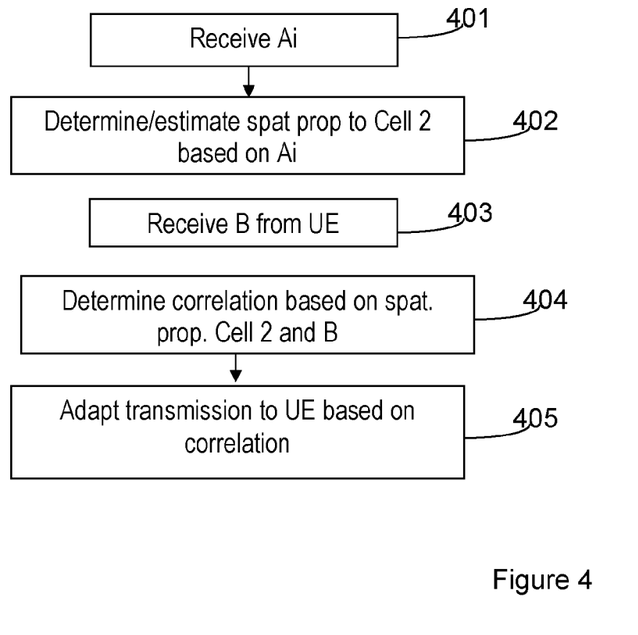
FIG. 4 illustrates a procedure in a network node according to an exemplifying embodiment.

An exemplifying embodiment of the method is illustrated in FIG. 4. The method is performed by a network node, such as a base station, BS1, in a wireless communication network applying precoding/beam forming and also reduced power subframes for inter-cell interference mitigation. The method illustrated in FIG. 4 comprises receiving 401 at least one estimate, which could be denoted Ai, of spatial properties, of a radio channel Ri between a base station BS1 and a respective at least one UEi, located in a region associated with ICI in relation to an underlay/neighboring cell. For example, Ai could be a PMI per UEi, and the region could be a cell expansion region between a high power node, BS1, and a low power node, BS2, serving the underlay/neighboring cell. The method further comprises estimating 402 spatial properties of a radio channel between the base station BS1 and at least part of the underlay/neighboring cell based on the received at least one estimate Ai. This part of the method is performed in order to determine which spatial properties that generates interference towards the underlay/neighboring cell.

The method illustrated in FIG. 4 further comprises receiving 403, from a UE served by the base station BS1, an estimate B of spatial properties of a radio channel between the base station BS1 and the UE. The estimate B could be e.g. a PMI or an indicator thereof. The method further comprises adapting 405 a transmission to the UE with regard to a reduced power subframe, based on properties of a correlation based on the estimated spatial properties of the radio channel between the base station BS1 and at least part of the underlay/neighboring cell, and the estimate B of the spatial properties of the radio channel between the base station BS1 and the UE. The determining of the correlation is illustrated as an action 404 in FIG. 4. This latter part of the method determines whether a transmission to the UE, with regular power, i.e. a power as a transmission power used in a non-reduced power subframe, would cause ICI to the underlay/neighboring cell, and adapts a transmission in order to keep the ICI within specified allowed limits.

By performing an embodiment of the method described above, the network node is enabled to control interference subjected towards the underlay/neighboring cell caused by downlink transmission to UEs, which is highly beneficial.

In order for the UEis to be able to feed back information about the spatial properties of radio channels in relation to BS1, the BS1 must transmit a signal, or type of signal, e.g. a reference signal, which may be received by UEis served by BS1 and/or served by a node BS2 in the underlay/neighboring cell. This signal could be a broadcast signal, which is transmitted by BS1 e.g. at certain intervals. Different UEis may receive different transmission from BS1, or they may receive the same signal/transmission at approximately the same point in time. The signal or signals transmitted from BS1 may be a reference signal or a type of reference signal, which is known to the UEs. The transmitted signal "S" propagates through air, and reaches the UEis and/or the UE as a signal "S'", which is the original signal affected by a channel. The signal could be a regular reference signal provided to enable UEs in the cell to perform e.g. CSI measurements. For example, a signal received by the UEis may be denoted $S'_{UEi}$ and a signal received by the UE associated with the adapted transmission may be denoted $S'_{UE}$.

The UEis and UE can perform channel measurements based on the received signal, and estimate properties of the channel based on S and S'. The estimated spatial properties, or a measure or value derived there from, such as a PMI, may then be reported back to the base station BS1, either directly, or via a node in the underlay/neighboring cell, e.g. a base station BS2.

The adaptation of a transmission to a UE, served by the base station BS1, in a reduced power subframe may comprise comparing the determined correlation to a threshold and performing different actions depending on the result of the comparison. For example, when the correlation exceeds a threshold, this may imply e.g. that there is an unacceptable correlation between the channel to the UE and the channel to the underlay/neighboring cell, which would lead to that a transmission to the UE using a certain precoder matrix, PM, would cause an unacceptable interference to the underlay/neighboring cell due to the similarity, i.e. high correlation, between the channel characteristics.

When the correlation exceeds a threshold, thus implying a certain interference, as described above, the method may comprise selecting not to schedule the UE or transmit to the UE in a subframe category associated with special interference restrictions, but instead in a subframe or subframe category where a higher interference may be tolerated. The expression "to exceed a threshold" is also considered to cover fulfillment of other types of decision criteria. Subframes associated with special interference restrictions, e.g. lower interference than regular, non-reduce power, subframes, are herein referred to as protected subframes, reduced power subframes, RPSF or a subframe category C. Such a selection of subframe may also be expressed e.g. as refraining from scheduling the UE in a protected subframe.

Alternatively, the UE may be scheduled in a subframe category C, e.g. in a low power subframe using a PM_B corresponding to the indicator B, even though the correlation exceeds a threshold. In such cases, one or more other measures may be taken to avoid subjecting the underlay/neighboring cell to interference above an interference limit. One such measure or action may be applying a transmission power $P_L$ for a transmission to the UE, when scheduled in the subframe category C, wherein the transmission power $P_L$ is lower than a transmission power used in a regular non-reduced power subframe. By regular transmission power is here meant a power which is used for transmission e.g. in another non-reduced power subframe category, or a transmission power used for transmission with another PM, which is less correlated with a PMx, corresponding to a channel to the underlay/neighboring cell, than a PM_B used for transmission to the UE.

Another such measure may be applying a transmission direction vertical tilt for a transmission to the UE when scheduled in a subframe category C. By transmission direction tilt is here meant that the transmission to the UE is directed away from a normal vertical angle, e.g. by being directed downwards, as compared to a horizontal plane. By tilting the transmission direction downwards, the transmission may be prevented from reaching the underlay/neighboring cell. This may also be referred to as vertical beamsteering or vertical beamforming Another measure to avoid subjecting UEs in the underlay/neighboring cell, to interference above an interference limit when scheduling a UE in a subframe category C and using a PM_B, may be determining an alternative precoder matrix to be used for a transmission to the UE when scheduled in a subframe category C. This alternative requires that there is a PM_Y, other than PM_B, which is acceptable for transmission to the UE, but which is less correlated to a PMx corresponding to the underlay/neighboring cell, than PM_B. By acceptable for transmission is here meant e.g. having a correlation with PM_B which exceeds a correlation threshold T2

The above alternatives relate to actions taken when a correlation determined based on estimated spatial properties of a channel to an underlay cell and spatial properties of a channel to a UE exceeds a threshold T. When said correlation does not exceed the threshold T, a transmission power $P_H$ may be applied to a transmission to the UE when scheduled in a subframe category C, wherein the transmission power $P_H$ is higher than transmission power $P_L$. That is, it may be determined that when the determined correlation does not exceed the threshold T, the interference subjected towards the underlay/neighboring cell will not exceed a predefined interference limit associated with subframe category C, when using a PM indicated by the UE. It should be noted that a normal antenna tilt is assumed in this case.

The correlation threshold T should be selected such that a correlation exceeding the threshold will imply that a signal transmitted to the UE using a PM-B and a certain transmission power, e.g. a regular transmission power, will cause an interference towards the underlay/neighboring cell which exceeds an interference threshold T3 or some other criterion. This could be achieved e.g. by simulations varying the values of the channel to the neighbor cell and the UE, determining the correlation and observing the resulting interference at locations in or close to the underlay cell. Alternatively, the resulting interference could be estimated based on precoder correlation and transmission power.

Further, when the correlation exceeds a threshold implying a certain interference towards the underlay/neighboring cell, but the UE is still to be scheduled in a subframe category C, an alternative precoder matrix could be determined, as described above. Thus, the adaptation of a transmission to the UE based on properties of the correlation may comprise determining a precoder matrix to be used for a transmission to the UE when scheduled in a subframe category C, wherein the determined precoder matrix is less correlated to a precoder matrix PMx corresponding to the underlay cell than a precoder matrix PM_B preferred by the UE.

As previously described, a precoder matrix to be used for a transmission to the UE may be determined based on the determined correlation. For example, if both the UE and the underlay cell have the same preferred PMI, a signal transmitted to the UE using the PM corresponding to this PMI causes a worst interference towards the underlay cell. Therefore, it could be decided that this PM/PMI should not be used for the UE. Instead, a PM having a lower correlation to the PM/PMI associated with the underlay/neighboring cell could be determined for the UE. The lower the correlation between the PM associated with the underlay cell and the PM used for the UE, the less interference is created towards the underlay cell.

The determining or selecting of a precoder matrix PM should be performed such that the interference towards the underlay/neighboring cell is as low as possible or at least lower than if the PM enabling the strongest signal reaching the underlay cell would have been used. A PM could be selected, which creates a beam which is orthogonal to a beam created by a PM optimal for the underlay cell, even though directed in the same direction.

In some exemplifying embodiments, in order to create a map or chart of allowed PMIs in a certain protected subframe, the information about spatial properties, e.g. PMI reports, could be combined with geo-location data such as GPS, OTDOA, AECID, or similar. The network node may request a position from a UE, and in association with that, e.g. within a certain time period from the receiving of geo-location data, it may store the corresponding PMI report(s) from the UE. That is, store the PMI reports corresponding to the position or approximate position of the UE, in association with information on the position Since positioning is much slower than PMI reporting, a filtered value of the PMI reports can be associated with each positioning point. This may then be associated with RSRP or other mobility measurements in order to create a map of typical preferred PMI for any position.

Since the positions of network nodes such as a macro and a pico node are fixed, it is possible to decide or determine areas where a certain PMI would generate too high interference to another cell to be useful, e.g. in a certain protected subframe. After a convergence time, e.g. during which information is gathered for a map database, this information could be used to set a number of RPSF in each node. The information could also be used e.g. in the scheduler to impose restrictions, e.g. for certain locations, where it will not be allowed to schedule a UE with a certain PMI/PM in a certain reduced power subframe or a certain set/category of reduced power subframes.

Embodiments described herein also relate to a network node. The network node is adapted to perform at least one embodiment of the method described above. The network node is associated with the same technical features, objects and advantages as the method described above and illustrated e.g. in FIGS. 3 and 4. The network node will be described in brief in order to avoid unnecessary repetition.

Figure 5:
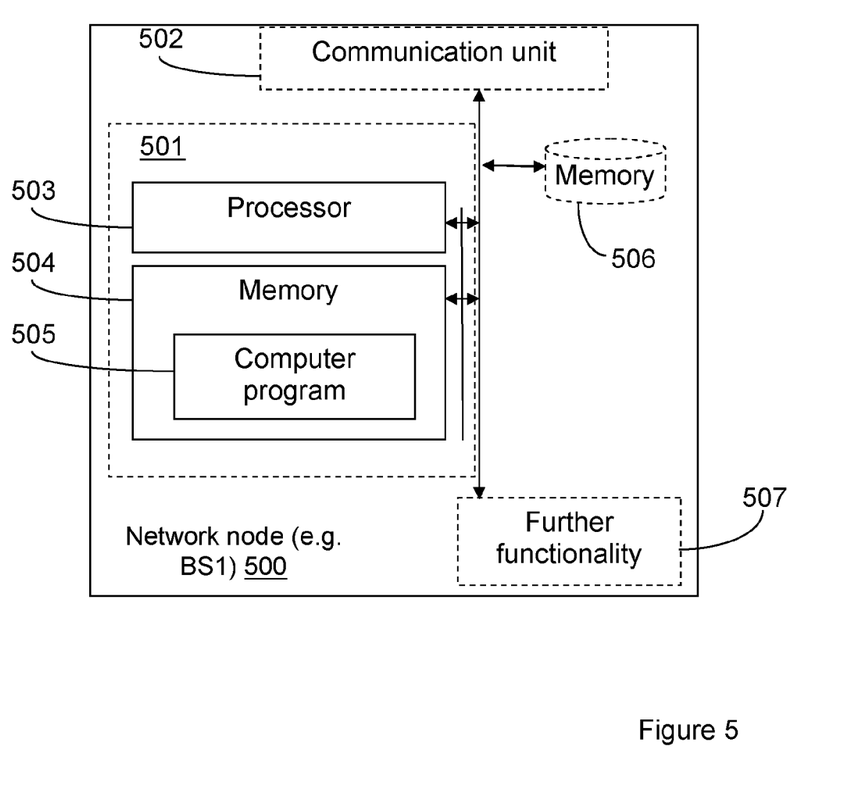
FIGS. 5 and 6 show a network node according to exemplifying embodiments.

Below, an exemplifying network node 500, adapted to enable the performance of an above described method will be described with reference to FIG. 5. The network node is operable in a wireless communication network comprising a base station BS1 operable to apply multi-antenna transmission and precoding/beam forming, and to serve a number of UEs. The part of the network node which is most affected by the adaptation to the herein described method is illustrated as an arrangement 501, surrounded by a dashed line. The network node 500 and arrangement 501 are further illustrated as to communicate with other entities via a communication unit 502 comprising means for wireless communication and/or means for wired communication. The network node or arrangement may further comprise other functional units 507, such as a scheduler, and may further comprise one or more storage units 506.

The arrangement part of the network node may be implemented and/or described as follows:

The network node comprises processing means, in this example in form of a processor 503 and a memory 504, wherein said memory is containing instructions 505 executable by said processor, whereby the network node is operable to perform the method described above. That is, the network node is operative to estimate spatial properties of a radio channel R1 between a base station BS1 and at least part of an underlay/neighboring cell based on information about spatial properties of a radio channel between the base station BS1 and a respective at least one user equipment, UEi, located in a region associated with inter cell interference in relation to the underlay/neighboring cell. The execution of the instructions further causes the network node to be operable to adapt a transmission to a UE, served by the base station BS1, in a reduced power subframe, based on a correlation between the spatial properties of the radio channel R1 and estimated spatial properties of a radio channel between the base station BS1 and the UE.

The instructions could be stored in form of a computer program having e.g. different modules. The computer program could be comprised by, or carried by a, computer program carrier. Such a carrier could be one of an electronic signal, an optical signal, a radio signal, or a computer readable storage medium, such as an electronic memory like RAM, ROM, Flash memory, magnetic tape, CD-ROM, DVD, Blueray disc, USB memory etc.

Figure 6:
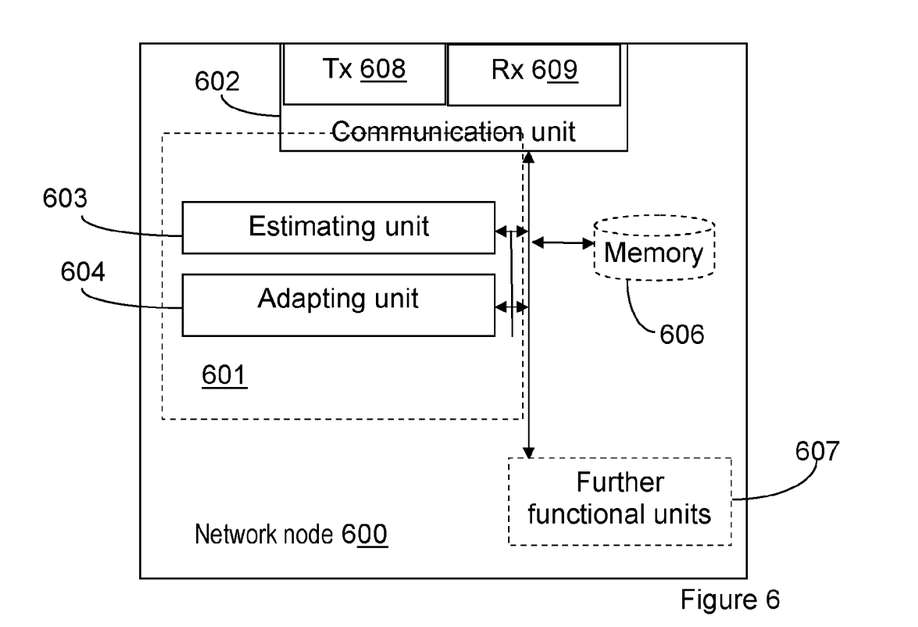

An alternative embodiment of the network node 500 is shown in FIG. 6. FIG. 6 illustrates a network node 600, operable in a wireless communication network applying multi-antenna transmission and precoding/beam forming.

The network node 600 comprises an estimating unit 603, configured to estimate spatial properties of a radio channel R1 between a base station BS1 and at least part of an underlay/neighboring cell based on information about spatial properties of a radio channel between the base station BS1 and a respective at least one user equipment, UEi, located in a region associated with inter cell interference in relation to the underlay/neighboring cell. The network node further comprises an adapting unit 604, configured to adapt a transmission to a UE, served by the base station BS1, in a reduced power subframe, based on a correlation between the spatial properties of the radio channel R1 and estimated spatial properties of a radio channel between the base station BS1 and the UE.

The estimating unit could alternatively be denoted e.g. determining unit. The estimation may, as previously described, comprise determining or calculating a mean value or a weighted sum based on information from the UEis. The estimation may alternatively or in addition comprise generating a map of preferred PMIs, or corresponding information, in different positions and/or directions in a cell.

The arrangement 601 could be implemented e.g. by one or more of: a processor or a micro processor and adequate software and memory for storing thereof, a Programmable Logic Device, PLD, or other electronic component(s) or processing circuitry configured to perform the actions described above, and illustrated e.g. in FIGS. 3 and 4.

Figure 7:
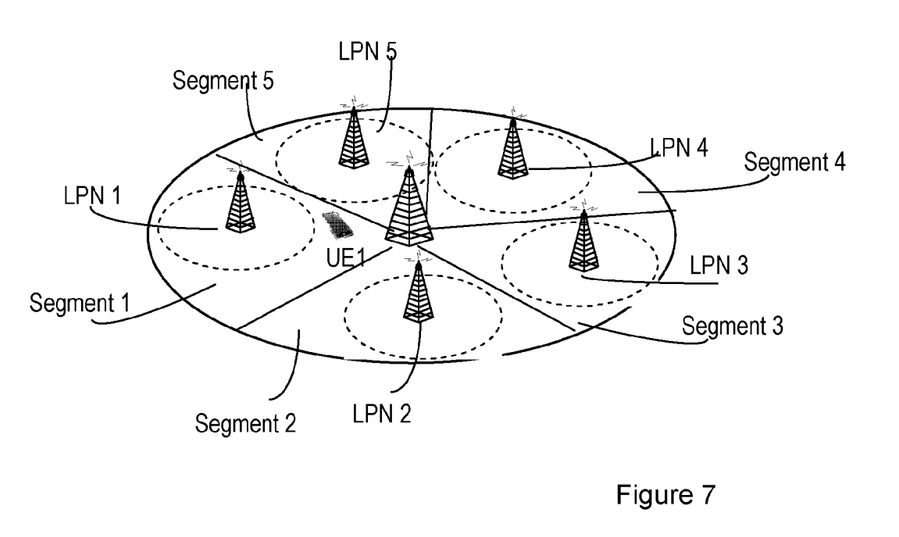
FIGS. 7-9 illustrates different scenarios in which exemplifying embodiments may be used.

In a network configuration where a macro is more or less completely surrounded by picos, most available PMI will correlate highly at least to the PM/PMIs preferred in one of the surrounding pico cells. This would reduce the possibility to make high-power transmission without transmission tilt in protected subframes, since there would be no, or almost no, low-correlation PM/PMIs. Such a scenario is illustrated in FIG. 7, showing a high power node surrounded by five LPNs, LPN 1-LPN 5.

However, each pico, or group of picos where similar PMIs are preferred, may be assigned only a subset of a total set of RPSFs, such that there will be at least some PMs which are possible to use with elevated power for each set of RPSFs. This will allow high power use in some direction/for some PMs in all or most RPSFs, even if the macro cell is almost completely covered by underlaid pico cells. The total number of RPSFs may need to be larger, to provide a sufficient number of reduced power subframes for each pico. However, even if the number of RPSFs is higher, since the macro is able to use them all with high power on some PMs, this will still likely be more efficient than a configuration where a smaller total number of RPSFs is assigned to all picos and thereby cannot be used with high power on any PMs by the macro. Returning again to FIG. 7, this would mean that the UE1 can be scheduled with high/regular power in subframes which are RPSFs for LPN2-LPN5, but not in subframes which are RPSFs for LPN1. The segments illustrated in FIG. 7 are only for illustrating different areas which could be associated with a set of excepted, excluded or protected PMs in a RPSF associated with a cell in said area.

Figure 8:
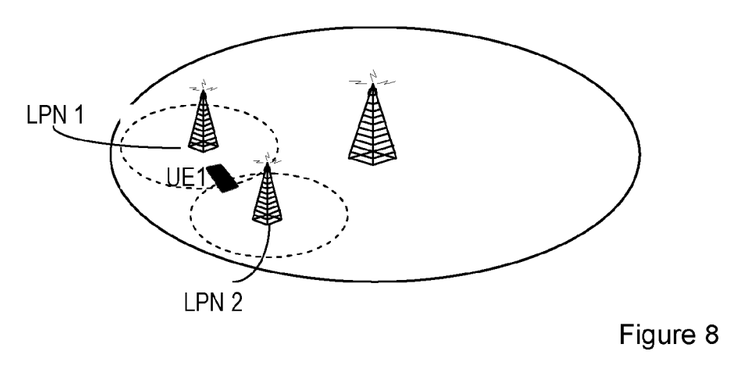

If picos are adjacent to one another, handover may take place from one pico to another without involving the macro. Such a scenario is illustrated in FIG. 8. In such cases, it may be necessary for the picos, LPN1 and LPN2 in the example in FIG. 8, to force some handovers, e.g. of UE1 in FIG. 8, to the macro instead of to an adjacent pico. This could be done in order for the macro to acquire the necessary information on spatial properties or PMI information also for the edge zones of the adjacent pico cells. As soon as the macro has acquired the PMI information from such a forced-handover UE, it can hand the UE over to the relevant target pico.

Alternatively, a UE in question for handover between adjacent picos, e.g. UE1 in FIG. 8, could be requested, by the serving network node, to make measurements on reference signals from the macro cell and provide information about spatial properties to the serving cell. From such information, the spatial properties of a channel from the macro cell to the inter-pico handover region may be determined, for example a preferred PMI or information from which such a PMI can be calculated. When a pico determines that a UE is in a zone where protection from macro interference is, or may be, needed, a UE measurement may be requested, and spatial properties of a radio channel to the macro may be determined. Information about the spatial properties may be received by the pico, which then can report this information, e.g. over the X2 interface, to the macro. Thus, the PMI or PMIs for which the transmission power in protected subframes such as RPSF/ABSF associated with the reporting pico should not be elevated, could be reported to the macro. If the UE also measures the path loss to the macro, then the pico can report to the macro a maximum power level to be permitted in protected subframes for that PMI, or indeed it can report allowed power levels for all PMIs respectively. In this way, the pico can prevent undue interference from the macro, while still allowing the macro to use the protected subframes to the maximum extent possible. The macro might receive such reports from several picos, and would in that case for each PMI use the lowest of the power levels reported for that PMI.

A macro node/cell may provide different RPSFs to different picos underlay/neighboring cells, or to different segments of the macro cell. That is, the interference in a certain subframe may be reduced for one underlay cell, but not for another underlay cell. In order for the RPSFs to serve their purpose, each pico needs to know which RPSF to use. This could be achieved in different ways, which will be described below.

A method performed by a network node in a wireless communication network comprising a base station BS1 and applying precoding/beam forming may be described as below. The wireless communication network further applies at least two sets of reduced power subframes for inter-cell interference mitigation in a cell associated with BS1, where each set is associated with a set of precoder matrices, PMs. The method comprises determining, for an underlay/neighboring cell, at least one PM being associated with, e.g. corresponding to, the estimated spatial properties of a radio channel between the base station BS1 and the underlay/neighboring cell. The method further comprises indicating, to the underlay/neighboring cell, which set, out of the at least two sets of reduced power subframes, to apply, based on the determined at least one precoder matrix.

In one embodiment, a macro may signal a number of sets of RPSFs to underlay picos. Each set of RPSFs could be associated with one or more precoder matrices, PMs, that are, excluded or protected for the set of RPSFs. Excepted, excluded or protected could in this case mean either that these PMs are not to be used at all in the set of RPSFs, or e.g. that the PMs could be used in said set of RPSFs, but only with a low/reduced transmission power, e.g. for UEs located close to BS1. These PMs could also be communicated to the picos, e.g. in form of corresponding PMIs. Thus, each pico would have information about different sets of RPSFs, and about one or more PMs connected to each set. Depending on which PMs or PMIs that are preferred by the pico, it would then use different sets of RPSFs. By preferred is, as before, meant a PM which entails the strongest signal to the pico. That is, a PM/PMI corresponding to the estimated spatial properties of a radio channel between the macro and the pico cell.

For example, the macro could determine, as previously described, the PM or PMs preferred by each pico and indicate these PMs to the pico. Then, the pico could compare the indicated PMs with the PMs associated with the different sets of RPSFs, and thus determine which RPSFs to use for scheduling UEs in need of ICI protection.

Alternatively, the pico may itself determine its preferred PM or PMs/PMIs and conclude which set or sets of RPSFs that apply to the own cell. A method performed by a network node in a wireless communication network comprising a base station BS2, e.g. pico, and applying precoding/beam forming may be described as below. The method comprises receiving, from an overlay/neighboring cell, information about at least two sets of reduced power subframes and precoder matrices associated with the respective sets. The method further comprises determining which set, out of the at least two sets, that is applicable for the BS2, based on estimated spatial properties of a radio channel between the overlay/neighboring cell and a cell associated with base station BS2.

The decision on which sets of subframes to protect for which PMI may be taken by the macro, possibly with input from picos about edge zone load per macro PMI so as to provide enough scheduling resources to picos with lots of edge zone traffic, and communicated to the picos e.g. as a list denoting which sets of subframes are protected for each particular PM or PMI. It is then up to the pico to know which macro PMI is relevant for its edge zone and to schedule edge zone UEs in subframes protected with respect to that PMI.

A larger cell which needs protection from macro interference as outlined above might cover an area where the spatial properties to the macro differ significantly over the area, e.g. a preferred PMI may be different in different parts of the cell area. In this case, different sets of protected subframes could be assigned to different areas of the cell, corresponding to different PMs or PMIs of the macro. Thereby, all areas where the same PMI is preferred, and thus the corresponding PM should not be used with high power by the macro in protected subframes, could be assigned the same set of protected subframes. For any UE which is to be scheduled, by a pico, in a protected subframe, the pico would need to keep track of the UE's preferred PMI towards the macro, so as to know in which set of protected subframes that UE should be scheduled.

Figure 9:
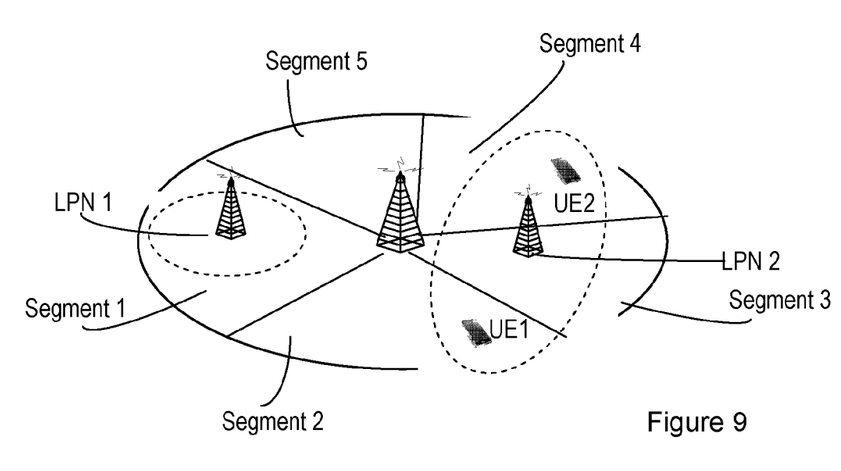

FIG. 9 illustrates a macro cell with two underlay pico cells, LPN1 and LPN2. For illustrative reasons, the macro is divided into segments, where each segment represents a set of PMs. That is, when scheduling and transmitting to a UE with a PM associated e.g. with segment 1, the bulk of the transmission energy will be directed within segment 1. Each set of PMs may be associated with a set of RPSFs.

In FIG. 9, the LPN2 stretches over three such segments of the macro. Thus, UEs located within different parts of the LPN2 cell will prefer PMIs from different sets, and thus be associated with different RPSFs. LPN2 must then, keep track of which RPSFs that should be used for the different UEs in different parts of the cell.

A network node, such as a macro base station BS1, may, as described above indicate, to nodes in a number of underlay/neighboring cells, information on which PMs or PMIs that are excepted, excluded or protected, and for which reduced power subframes these PMs or PMIs are e.g. protected, respectively. Such a network node may be described as follows.

Network node operable in a wireless communication network comprising a base station BS1, and applying precoding/beam forming and also applying reduced power subframes for inter-cell interference mitigation. The base station BS1 has, or is operable to have, at least one underlay or neighboring cell. The network node comprises at least one processor and at least one memory, where said at least one memory contains instructions which are executable by said at least one processor, whereby the network node is operative to: indicate, to the at least one underlay/neighboring cell, at least two different sets of reduced power subframes and further to indicate at least one PM or PMI, which is protected for each respective set of reduced power subframes. By protected is here meant, as before, either not allowed for use in a certain set of reduced power subframes, or allowed for use in said certain set of reduced power subframes but only with a low/reduced transmission power, i.e. as compared to a regular transmission power. That is, for an indicated set of reduced power subframes, one or more PMs or PMIs are also indicated, which are to be excepted, excluded or protected for the indicated set of reduced power subframes.

A network node having the functionality described above could be implemented e.g. by one or more of: a processor or a micro processor and adequate software and memory for storing thereof, a Programmable Logic Device, PLD, or other electronic component(s) or processing circuitry configured to perform the actions described above.

In a previous application, filed by the applicant, a method is described in which information about spatial properties of a channel between a base station BS1 and a base station BS2 in an underlay/neighboring cell is determined by the BS2 instead of being estimated based on UE information, as described herein. In a generic formulation of the solution described herein, the solution described in the previously filed application could be included as an embodiment. However, a generic description of the solution, e.g. method and network node described herein, may also refer to implementations where the solution described in the previously filed application is not included as an embodiment.

It is to be understood that the choice of interacting units or modules, as well as the naming of the units are only for exemplifying purpose, and transmitting and receiving nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more". All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the presently described concept, for it to be encompassed hereby.

ABBREVIATIONS

ABSF Almost Blank SubFrame
AECID adaptive enhanced cell ID (fingerprinting positioning)
GPS Global Positioning System
ICI Inter-Cell Interference
ICIC Inter-Cell Interference Coordination
LPN Low Power Node, e.g. pico
OTDOA Observed Time Difference Of Arrival
RPSF Reduced Power SubFrame
PMI Precoder Matrix Indicator

The invention claimed is:

1. A method performed by a network node in a wireless communication network applying precoding/beam forming and also reduced power subframes for inter-cell interference mitigation, the method comprising:
estimating spatial properties of a radio channel between a base station and at least part of an underlay/neighboring cell based on information about spatial properties of a radio channel between the base station and a respective at least one user equipment (UE) located in a region associated with inter cell interference in relation to the underlay/neighboring cell;
adapting a transmission to a UE, served by the base station, in a reduced power subframe, based on a correlation between the spatial properties of the radio channel and estimated spatial properties of a radio channel between the base station and the UE.

2. The method according to claim 1, wherein the adapting comprises:
selecting, based on the correlation, at least one of:
a transmission power;
and/or
a precoder matrix;
for transmission to the UE.

3. The method according to claim 1, wherein the adapting comprises one of:
when the correlation exceeds a threshold:
applying a reduced transmission power for a transmission to the UE when scheduled in a reduced power subframe, wherein the reduced transmission power is lower than a transmission power in a non-reduced power subframe; and
when the correlation does not exceed the threshold:
applying a non-reduced transmission power for a transmission to the UE when scheduled in a reduced power subframe, wherein the non-reduced transmission power is higher than the reduced transmission power.

4. The method according to claim 1, wherein the information about spatial properties of a radio channel between the base station and a respective at least one UE comprises a channel covariance; a precoding matrix index (PMI); or an indicator of either thereof.

5. The method according to claim 1, wherein the at least one UE have either recently been handed over from the underlay/neighboring cell to a base station, or, is in question for hand over from the base station to the underlay/neighboring cell.

6. The method according to claim 1, wherein the at least one UE is served by the underlay/neighboring cell, and the information about spatial properties is received via a serving network node in the underlay/neighboring cell.

7. A network node operable in a wireless communication network applying precoding/beam forming and also applying reduced power subframes for inter-cell interference mitigation, the network node comprising at least one processor and at least one memory, said at least one memory containing instructions executable by said at least one processor, whereby the network node is operative to:
estimate spatial properties of a radio channel between a base station and at least part of an underlay/neighboring cell based on information about spatial properties of a radio channel between the base station and a respective at least one user equipment (UE) located in a region associated with inter cell interference in relation to the underlay/neighboring cell; and to
adapt a transmission to a UE, served by the base station, in a reduced power subframe, based on a correlation between the spatial properties of the radio channel and estimated spatial properties of a radio channel between the base station and the UE.

8. The network node according to claim 7, wherein the network node is further operative to:
select, based on the correlation, at least one of:
a transmission power;
and/or
a precoder matrix;
for transmission to the UE.

9. The network node according to claim 7, wherein the network node is further operative to adapt the transmission by one of:

when the correlation exceeds a threshold:
applying a transmission power for a transmission to the UE when scheduled in a reduced power subframe, wherein the transmission power is lower than a transmission power in a non-reduced power subframe; and
when the correlation does not exceed the threshold:
applying a transmission power for a transmission to the UE when scheduled in a reduced power subframe, wherein the transmission power is higher than transmission power.

10. The network node according to claim 7, wherein the information about spatial properties of a radio channel between the base station and a respective at least one UE comprises a comprises a channel covariance; a precoding matrix index (PMI); or an indicator of either thereof.

11. The network node according to claim 7, wherein the at least one UE have either recently been handed over from the underlay/neighboring cell to a base station, or, is in question for hand over from the base station to the underlay/neighboring cell.

12. The network node according to claim 7, wherein the at least one UE is served by the underlay/neighboring cell, and the information about spatial properties is received via a serving network node in the underlay/neighboring cell.

13. The network node according to claim 7, wherein the network node is the base station BS1.

14. The network node according to claim 7, wherein the wireless communication network is at least partly operated according to a standard associated with 3GPP LTE.

15. A network node operable in a wireless communication network applying precoding/beam forming and also applying reduced power subframes for inter-cell interference mitigation, the network node comprising:
at least one processor;
at least one memory containing operations executable by said at least one processor, the operations comprising:
estimating spatial properties of a radio channel between a base station and at least part of an underlay/neighboring cell based on information about spatial properties of a radio channel between the base station and a respective at least one user equipment (UE) located in a region associated with inter cell interference in relation to the underlay/neighboring cell; and
adapting a transmission to a UE, served by the base station, in a reduced power subframe, based on a correlation between the spatial properties of the radio channel and estimated spatial properties of a radio channel between the base station and the UE.

16. A computer program product comprising a non-transitory computer readable storage medium storing program code, which when run by a processor in a network node causes the network node to perform the method according to claim 1.

17. The method according to claim 1, wherein the adapting comprises:
selecting, based on the correlation, at least one of a downlink transmission tilt and a subframe category, in which to schedule the UE for transmission to the UE.

18. The method according to claim 1, wherein the adapting comprises, when the correlation exceeds a threshold, refraining from scheduling the UE in a reduced power subframe.

19. The method according to claim 1, wherein the adapting comprises, when the correlation exceeds a threshold, applying a transmission direction tilt for a transmission to the UE when scheduled in a reduced power subframe.

20. The method according to claim 1, wherein the adapting comprises, when the correlation exceeds a threshold, determining an alternative precoder matrix to be used for a transmission to the UE when scheduled in a reduced power subframe.

21. The network node according to claim 7, wherein the network node is further operative to select, based on the correlation, for transmission to the UE, at least one of a downlink transmission tilt and a subframe category, in which to schedule the UE.

22. The network node according to claim 7, wherein the network node is further operative to adapt the transmission, when the correlation exceeds a threshold, by refraining from scheduling the UE in a reduced power subframe.

23. The network node according to claim 7, wherein the network node is further operative to adapt the transmission, when the correlation exceeds a threshold, by applying a transmission direction tilt for a transmission to the UE when scheduled in a reduced power subframe.

24. The network node according to claim 7, wherein the network node is further operative to adapt the transmission, when the correlation exceeds a threshold, by determining an alternative precoder matrix to be used for a transmission to the UE when scheduled in a reduced power subframe.

* * * * *

UNITED STATES PATENT AND TRADEMARK OFFICE
CERTIFICATE OF CORRECTION

PATENT NO. : 10,070,396 B2  
APPLICATION NO. : 15/123921  
DATED : September 4, 2018  
INVENTOR(S) : Göransson et al.

Page 1 of 1

It is certified that error appears in the above-identified patent and that said Letters Patent is hereby corrected as shown below:

In the Specification

In Column 1, Line 19, delete "Coordination ICIC," and insert -- Coordination, ICIC, --, therefor.

In Column 3, Line 54, delete "FIGS. 7-9 illustrates" and insert -- FIGS. 7-9 illustrate --, therefor.

In Column 10, Line 15, delete "beamforming" and insert -- beamforming. --, therefor.

In Column 10, Line 27, delete "T2" and insert -- T2. --, therefor.

In Column 11, Line 30, delete "position Since" and insert -- position. Since --, therefor.

In the Claims

In Column 18, Line 15, in Claim 10, delete "comprises a comprises a" and insert -- comprises a --, therefor.

Signed and Sealed this  
Twenty-second Day of January, 2019

Andrei Iancu  
*Director of the United States Patent and Trademark Office*